UNITED STATES PATENT OFFICE.

CORNELIUS COLLINS, OF BURLINGAME, CALIFORNIA.

LATH-FASTENER.

1,105,183.　　　Specification of Letters Patent.　　Patented July 28, 1914.

Application filed March 19, 1913. Serial No. 755,337.

*To all whom it may concern:*

Be it known that I, CORNELIUS COLLINS, a citizen of the United States, residing at Burlingame, in the county of San Mateo and State of California, have invented new and useful Improvements in Lath-Fasteners, of which the following is a specification.

This invention relates to lathing, and particularly to an improved fastener for metallic lath.

My observations of the present practice in securing metal lath to studding, and particularly to metal studding, have led me to devise and provide a simple, practical fastener, economical of material, of cost, of manufacture, and of application, and which lath fastener is provided for the object of securing a smoother surface on the exterior of the lath for the application of plaster, and which contemplates various important features all productive of a more satisfactory lath structure than the present methods in vogue of fastening metal lath to metal or other studding by wiring.

Divers means have been provided for fastening metal lath to metal studding, most of which consist of outwardly projected prongs, wiring devices, etc., which are objectionable for the reason that they produce in the fastened lath protuberances of varying lengths which must be covered with the plaster, and therefore require plaster to be applied to a whole surface equal in depth to the amount of projection of the highest protuberances from the plane of the wire lath; and one of the particular objects of my invention is to provide a lath fastening device in which a minimum degree of projection of protuberances can be had, thus enabling the application of a plastic layer of minimum thickness. Further, my improved fastener contemplates the provision of a structure enabling the lather to more readily make joints of the lath when necessary, and to produce better corner joints. With the object in view of saving labor in lathing operations, my improved fastener is of such construction that an unskilled laborer can apply and fasten the lath as efficiently, rapidly and perfectly as a more skilled laborer such as is now required for the difficult and arduous task of wiring the lath or bending fastening prongs, such as are used in some types of fasteners.

The invention consists of the provision of a relatively rigid, stiff female part coöperable with a fastening element of a bendable extensible type adapted to be registered with the complementary part and expanded or extended thereby when pressure or power is applied to the bendable part.

Figure 1:
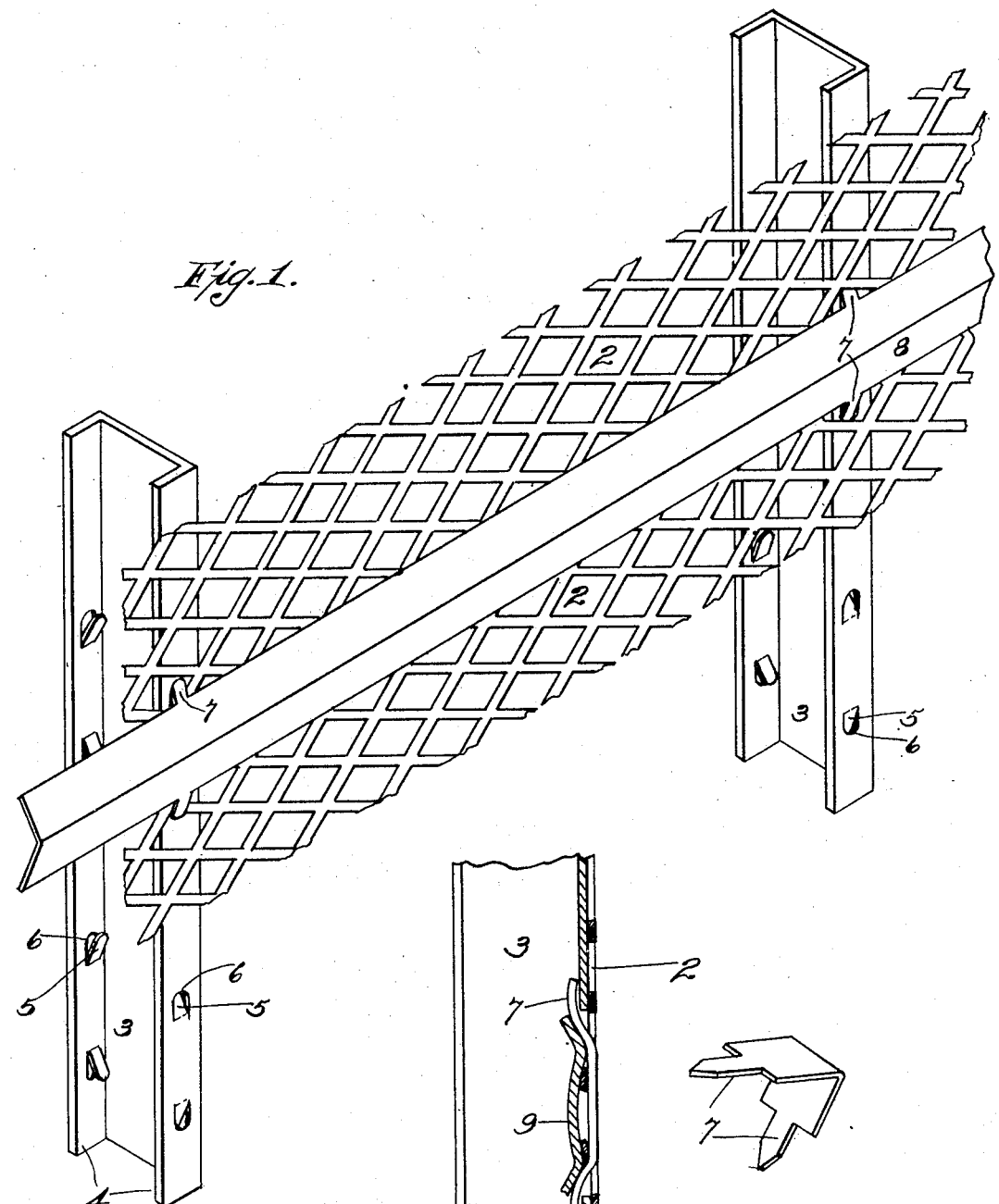
Figure 2:
Figure 3:
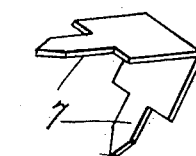

Figure 1 is a perspective view of the improved fastener, shown as securing a fragment of metal lath. Fig. 2 is an elevational view of the rigid member in partial section, showing the expanded complementary male part. Fig. 3 is a perspective view of a type of an expansible part of the fastener.

In the present embodiment the invention is shown as consisting of rigid supports, to which a lath, particularly a metal lath 2 is to be applied, the rigid or supporting part here comprising a metal studding which may be of any desired transverse section, a channel iron 3 being here represented. The studding 3 to which the lath is to be applied is provided at divers points in its sides, faces or flanges, as at 4, with downwardly and oppositely bent prongs 5—5, depressed sufficiently below the inner surface of the flange or body of the metal 4 to form a pocket 6 through which will be automatically expanded or spread the complementary prongs 7—7 of the male part of the fastener, which part consists of a body portion 8, preferably of hipped cross section as A-shaped, with the parts 7—7 diverging from opposite sides of the body portion, and which parts are so spaced in manufacture as to approximately equal the distances between coördinate apertures or pockets 6—6 in the wall or flange 4 of the fixed part 3 or studding.

In operation the male part of the fastening device is moved into position so that its prongs 7—7 approximately register with the apertures 6—6, after the sheet of lath 2 has been laid upon the side of the studding members 3—3, then by pressure as from blows of sufficient force the expansible part 8 of the fastener is driven so that its extensible or expansible prongs 7—7 enter the apertures or pockets 6—6, and the prongs 7 preferably being of less rigid material than the material of which the studding 3 is made, will be diverged by the inclined prongs or shoulders 5, which substantially act as dies upon the bendable, expansible prongs 7—7 of the male part of the fastener, the separation and spreading of the prongs being obtained by the application of sufficient blows on the body portion 8 of the male part of the fastener to separate the prongs so they will be thoroughly interlocked in the apertures 6—6, and then the body portion 8 at its part contiguous to the studding 3 can be hammered down until it assumes a position close to the surface of the studding to which it is applied, and thus firmly holds the strands or parts of the metal lath 2 against the studding.

For the purpose of throwing the prongs 7—7 of the male part of the fastening device to their maximum spreading position, the material of the flange, wall, or other surface of the studding between the apertures 6—6 thereof may be depressed as at 9 to form a shallow pocket, Fig. 2, toward which the body portion 8 of the exterior part of the fastener can be hammered, not only effecting the maximum spreading of the locking prongs 7—7, but also providing for the depression by hammering of the body portion 8, so as to reduce the protuberances or projection of the latter above the plane of the pocket to a minimum.

In Fig. 1 the expansible part of the fastening device 8 is shown as having its body portion of considerable length the edges of which are oppositely provided at suitable points with locking prongs 7—7, thus the member 8 provides a horizontal or transverse brace between the members 3—3, to which the lathing may be applied. However, in Fig. 3 I have shown the male or expansible part of the fastener as of relatively short width, so that these may be applied at divers points on the lath to fasten the same to the studding without extending from one part 3 to another.

It is understood that while I have referred to the members 3—3 as studdings, they are applicable as furring, ceiling members, or reinforce members, or in any of the other ways for which metal lath may be used, and must be fastened to a suitable support.

The rigid or stationary part as 3 to which the lath is to applied, may be provided with the oppositely inclined pockets 6—6 at suitable intervals, and at any part of its area as may be desired.

Having thus described my invention, what I claim and desire to secure by Letters Patent is:

1. A fastener for metal lathing, comprising a support having a pair of oppositely inclined and adjacent tongues struck inwardly and away from the lathing to be supported, and an open member A-shaped in cross section with bendable prongs at the opposite margins thereof insertible and separable by the tongues and adapted to interlock with the openings formed by the striking out of the tongues when pressure is applied to the apex of said A-shaped member.

2. A lath supporting member having a depressed pocket, the ends of which are severed from the contiguous stock to form apertures, and a bendable metallic fastener bent centrally and provided with divergent points on opposite margins in the plane of its length for embracing the mesh of the lath, and which points spread and enter said apertures when pressure is applied at the apex of said fastener.

3. A lath supporting member consisting of a metallic studding having a depressed pocket, the bottom of which is below the outer face of the studding, the ends of the pocket being severed from the contiguous stock to form apertures, and a bendable hipped metallic fastener having marginal divergent points on opposite margins for straddling the strands of said metallic lath, and which points spread and enter said aperture when pressure is applied at the bended hipped portion of the fastener, said hipped portion of the fastener when spread being received into said pocket and lying substantially in the plane of the studding.

In testimony whereof I have hereunto set my hand in the presence of two subscribing witnesses.

CORNELIUS COLLINS.

Witnesses:
W. W. HEALEY,
BEN HARRISON.